(12) United States Patent
Stewart et al.

(10) Patent No.: US 7,710,646 B2
(45) Date of Patent: May 4, 2010

(54) ANTI-BULGING PROJECTION SCREEN STRUCTURE

(75) Inventors: Patrick H. Stewart, Rolling Hills Estates, CA (US); Joaquin Rivera, San Pedro, CA (US)

(73) Assignee: Stewart Filmscreen Corporation, Torrance, CA (US)

( * ) Notice: Subject to any disclaimer, the term of this patent is extended or adjusted under 35 U.S.C. 154(b) by 222 days.

(21) Appl. No.: 11/853,972

(22) Filed: Sep. 12, 2007

(65) Prior Publication Data
US 2008/0062516 A1   Mar. 13, 2008

Related U.S. Application Data

(60) Provisional application No. 60/825,348, filed on Sep. 12, 2006.

(51) Int. Cl.
*G03B 21/56* (2006.01)
(52) U.S. Cl. ......................... 359/450; 359/451
(58) Field of Classification Search ................. 359/450, 359/451
See application file for complete search history.

(56) References Cited

U.S. PATENT DOCUMENTS

| | | | |
|---|---|---|---|
| 1,330,447 A * | 2/1920 | Pech | 359/451 |
| 2,909,963 A * | 10/1959 | Lane, Jr. | 359/451 |
| 3,475,086 A * | 10/1969 | Vetter | 352/69 |
| 3,932,033 A | 1/1976 | Osborn et al. | |
| 3,992,841 A | 11/1976 | Ward, Jr. | |
| 4,017,152 A | 4/1977 | Allen | |
| 5,103,339 A | 4/1992 | Broome | |
| 5,125,732 A | 6/1992 | Jacobson et al. | |
| 5,210,641 A | 5/1993 | Lewis | |
| 6,191,886 B1 | 2/2001 | Sinkoff | |
| 6,462,769 B1 | 10/2002 | Trowbridge et al. | |
| 6,733,136 B2 | 5/2004 | Lantz et al. | |
| 6,816,308 B1 | 11/2004 | Shopp | |
| 6,848,795 B2 | 2/2005 | Kaminsky et al. | |
| 6,981,350 B1 | 1/2006 | Redmon | |
| 7,466,483 B2 * | 12/2008 | Danthony | 359/450 |
| 2004/0100691 A1 | 5/2004 | Sinkoff | |

\* cited by examiner

*Primary Examiner*—Christopher Mahoney
(74) *Attorney, Agent, or Firm*—Hasse & Nesbitt LLC; Donald E. Hasse

(57) ABSTRACT

A home cinema theater projection screen structure and method of making same are provided wherein a sheet of projection screen material of selected size is formed to a configuration having concave top and/or bottom edges, the projection screen material then being attached under tension to a mounting structure that defines an inwardly curved projection surface in the mounted condition whereby bulging of the projection surface of the screen is substantially eliminated. Movable side masking panels are included the structure in order to define a selected aspect ratio for the projection surface.

19 Claims, 6 Drawing Sheets

ANTI-BULGING PROJECTION SCREEN STRUCTURE

CROSS REFERENCE TO RELATED APPLICATION

This application claims the benefit of co-pending U.S. Provisional Application Ser. No. 60/825,348, filed Sep. 12, 2006.

FIELD OF INVENTION

The present invention relates generally to projection screens for use in displaying imagery from a TV, motion picture projector, or video projector, or a computer generated images display, or the like, and more particularly to a projection screen structure configured for reducing bulging in the screen surface in the mounted condition.

BACKGROUND OF INVENTION

Projection screens of various kinds find substantial use for imagery projection in a large variety of situations for slide or motion picture projection, television or computer generated display, or other imagery projection.

In the mounting of conventional large size flexible projection screen materials, the surface of the screen will bulge outwardly in the center of the screen and on the edges by reason of insufficient tension that can be applied to the screen material to secure the screen in place. This "bellying out" of the screen surface can occur in either curved or flat surface screens and may result in distortion of the projected image. Further, if movable masking systems are utilized in conjunction with the screen, the bulging of the screen surface on the vertical sides can interfere with the movement of the masks or otherwise contact the moving masks, which can result in damage to the screen surface at the sides and consequent diminished image quality as well as possible subsequent destruction of the screen itself.

SUMMARY OF THE INVENTION

The present invention provides an improved projection screen and method of making same wherein a projection screen material of selected size in a generally rectangular shape is formed as by cutting the top edge to the shape of an arc extending from side to side of the material whereby the vertical center dimension (height) of the screen material is shortened relative to the vertical side dimension of the material. Alternatively, the bottom edge can be similarly formed, or both the top and bottom edges can be so formed. With the screen material so formed and tensioned vertically to a generally rectangular mounting frame, the bulging (bellying out) of the screen can be substantially eliminated. In addition, the screen material can be formed to define outwardly curved sides which in the mounted condition further reduces the tendency of the screen material to bulge by relieving side-to-side tension in the mounted screen material.

The screen material configured according to the invention can be mounted with greater tension, especially in the central regions of the screen, than can be applied to rectangular shaped screen material. In the mounted condition, the top and/or bottom concavity of the screen material together with the increased tension that can be applied causes the screen of the invention to assume the intended substantially rectangular shape with a flatter vertical plane for the projection screen and substantially eliminates the undesirable bulging (or bellying out) of the screen surface in the mounted condition. Eliminating the bulging in the mounted screen is particularly important where movable masking panels are used in conjunction with the projection screen in order to prevent contact between the movable panels and the screen surface.

The invention represents a significant advancement for home cinema theater applications using fixed, curved widescreen technology for displaying projected images with improved viewing at wide angles. Combining projector and anamorphic lens technology with the advancement in curved screen technology provided by this invention can result in bright, high-contrast, super-wide, distortion-free image projection for cinema formats filmed in wide formats, such as the 2.35:1 or 2.40:1 aspect ratio format commonly used in theatrical releases, all without the annoying upper or lower black bars framing the projected image that characterize many broadcast formats. The many features of the invention include electronically controlled side masking panels to accommodate other aspect ratios, such as a 16:9 ratio characteristic of television broadcast formats.

The invention relates to a projection screen structure for home cinema theater applications in displaying an image from a projection source, comprising: (a) a sheet of flexible projection screen material having a projection surface for displaying an image projected thereon, said sheet of material having top and bottom edges and first and second side edges, at least one of said top and bottom edges having a curved shape defining a distance at the vertical center of said sheet between said top and bottom edges of said sheet that is smaller than the length of said side edges; (b) a generally fixed mounting structure defined by generally parallel inwardly curved top and bottom portions and generally parallel side portions for supporting said sheet of material as a curved projection screen defining an inwardly curved projection surface up to about 12 feet in width; (c) means for tensioning said sheet of material onto said mounting structure whereby outward bulging of said material in the mounted condition on said mounting structure is substantially eliminated; and (d) first and second movable masking panels disposed at respective first and second sides of said projection screen.

The invention also relates to a projection screen structure for home cinema theater applications in displaying an image from a projection source, comprising: (a) a sheet of flexible projection screen material having a projection surface for displaying an image projected thereon, said sheet of material having top and bottom edges and outwardly curved first and second side edges, each of said top and bottom edges having an inwardly curved shape defining a distance at the vertical center of said sheet between said top and bottom edges of said sheet that is smaller than the length of said side edges; (b) a generally fixed mounting structure defined by generally parallel inwardly curved top and bottom portions and generally parallel side portions for supporting said sheet of material as a curved projection screen defining an inwardly curved projection surface up to about 12 feet in width; (c) means for tensioning said sheet of material onto said mounting structure whereby outward bulging of said material in the mounted condition on said mounting structure is substantially eliminated; and (d) first and second movable masking panels disposed at respective first and second sides of said projection screen.

The invention further relates to a method for manufacturing a projection screen structure for home cinema theater applications in displaying an image from a projection source, comprising the steps of: (a) providing a sheet of flexible projection screen material having a projection surface for displaying an image projected thereon; (b) forming said sheet of material to a configuration having top and bottom edges and first and second side edges, at least one of said top and bottom edges having an inwardly curved shape defining a distance at the vertical center of said sheet between said top and bottom edges of said sheet that is smaller than the length of said side edges; (c) providing a generally fixed mounting structure defined by generally parallel inwardly curved top and bottom portions and generally parallel side portions for supporting said sheet of material as a curved projection screen defining an inwardly curved projection surface up to about 12 feet in width; and (d) attaching said sheet of material in a tensioned condition on said mounting structure defining a curved projection surface on said material whereby outward bulging of said material in the mounted condition on said mounting structure is substantially eliminated.

BRIEF DESCRIPTION OF THE DRAWINGS

The invention will be more clearly understood from the following detailed description of representative embodiments thereof read in conjunction with the accompanying drawing figures, wherein.

DETAILED DESCRIPTION OF INVENTION

Figure 1:
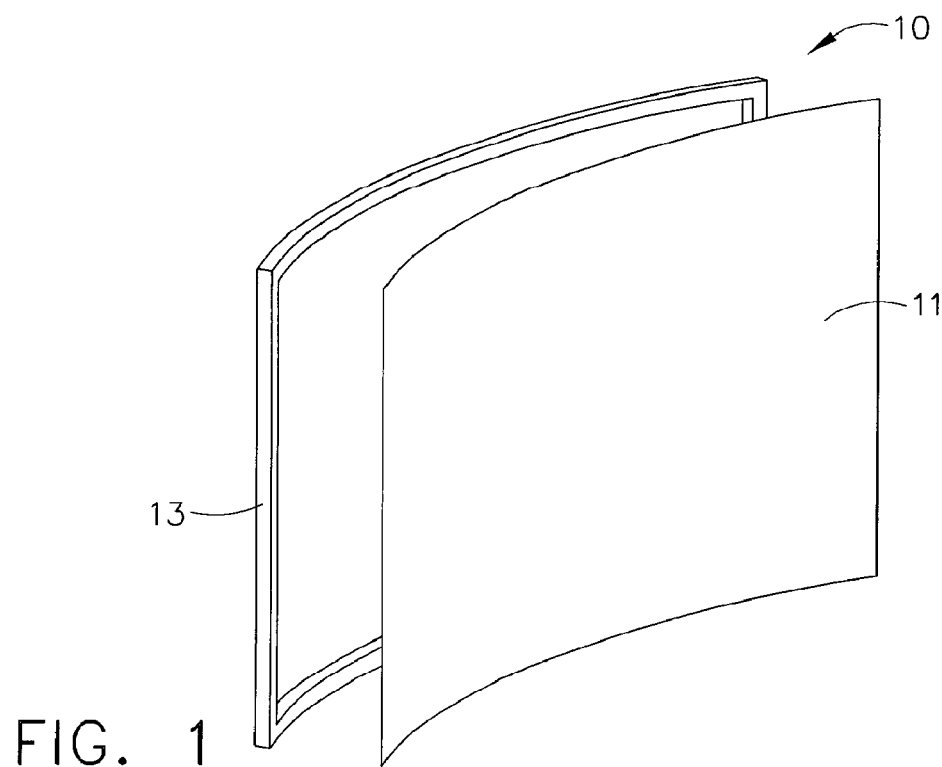
FIG. 1 shows a perspective view of a projection screen assembly.
Figure 2:
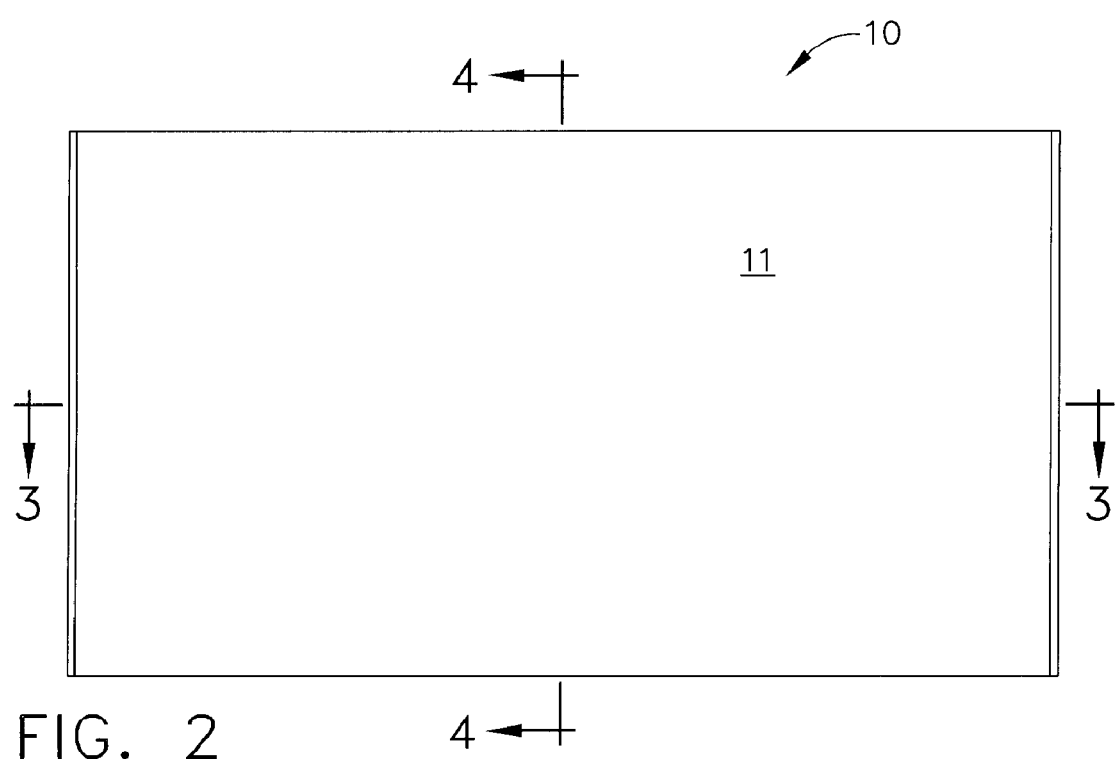
FIG. 2 is an front view of the screen assembly illustrated in FIG. 1.
Figure 3:
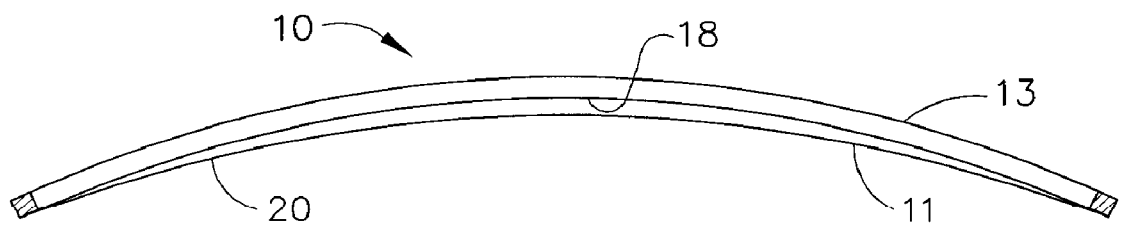
FIG. 3 is a sectional view of the FIG. 2 structure taken along line 3-3.
Figure 4:
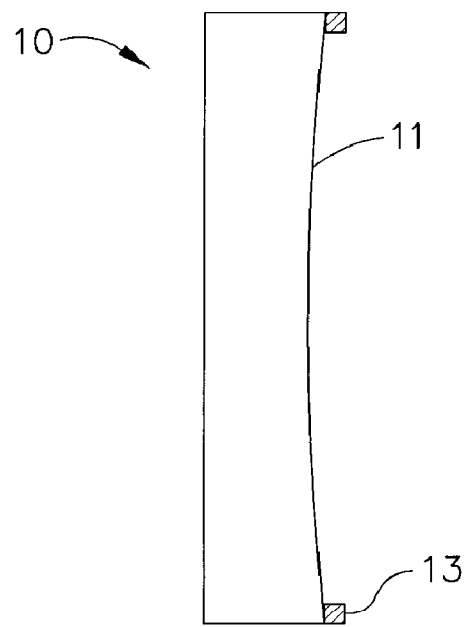
FIG. 4 is a sectional view of the FIG. 2 structure taken along line 4-4.
Figure 5:
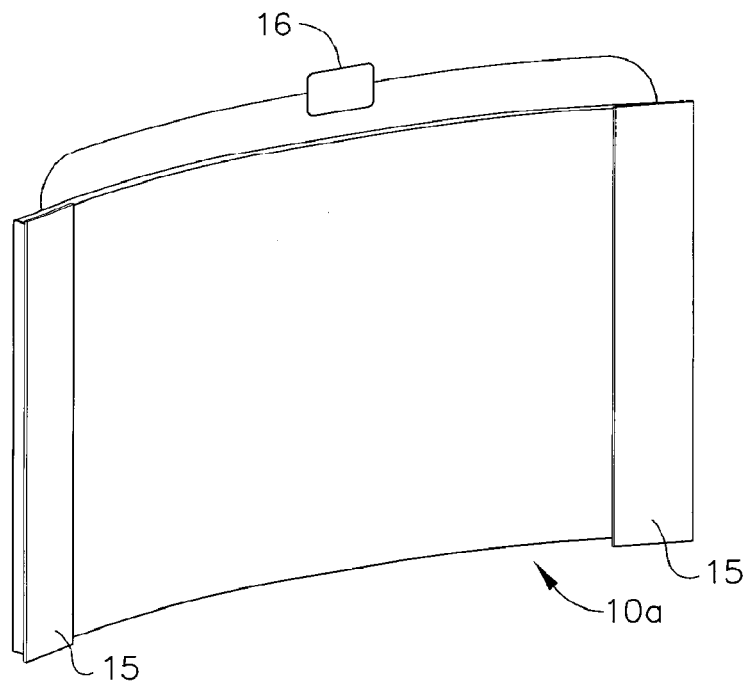
FIG. 5 is a perspective view of the FIG. 2 screen with movable masking panels.
Figure 6:
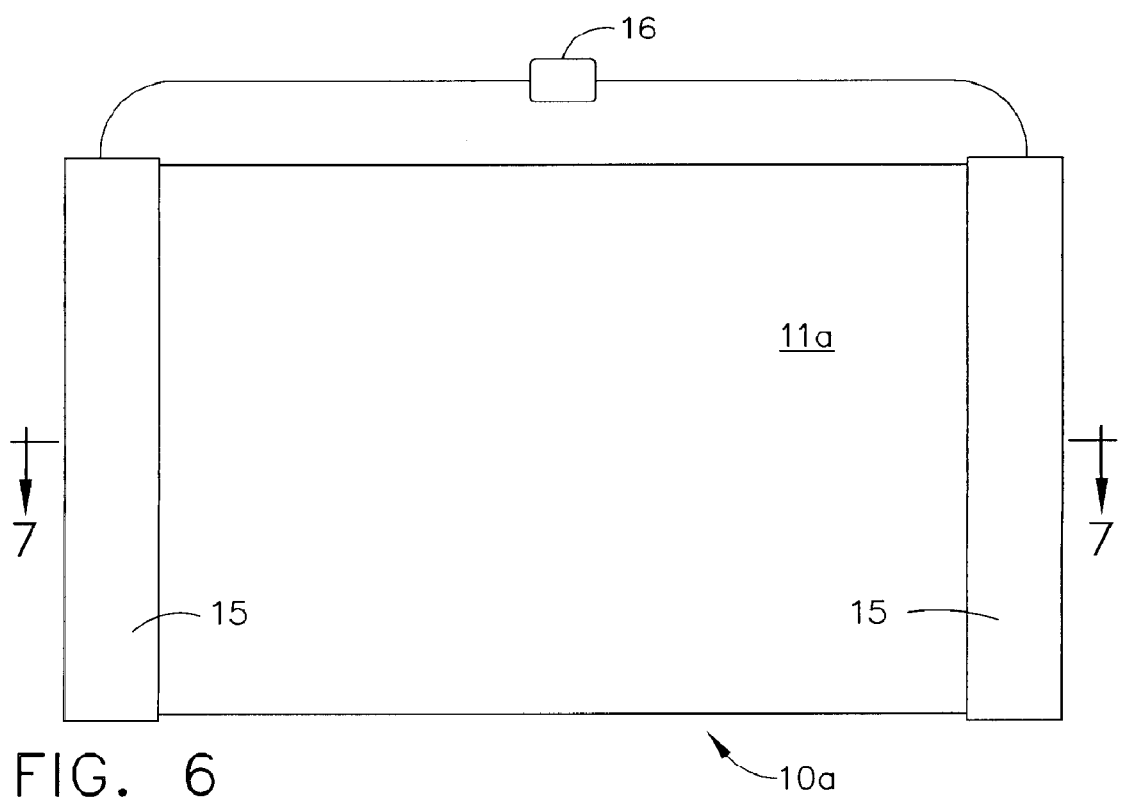
FIG. 6 is a front view of the screen illustrated in FIG. 5.
Figure 7:
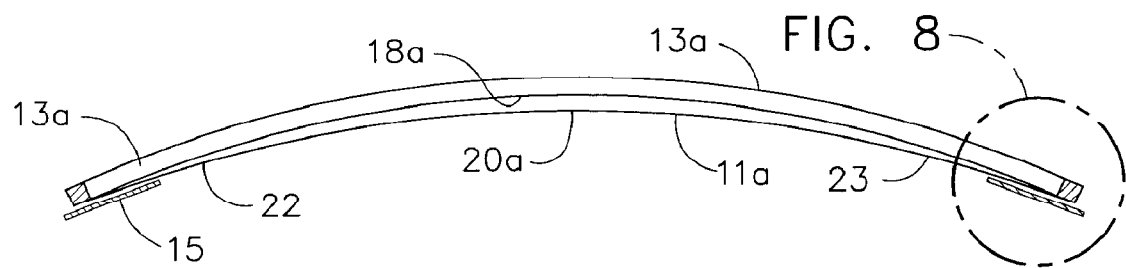
FIG. 7 is a sectional view of the screen of FIG. 6 taken along line 7-7.
Figure 8:
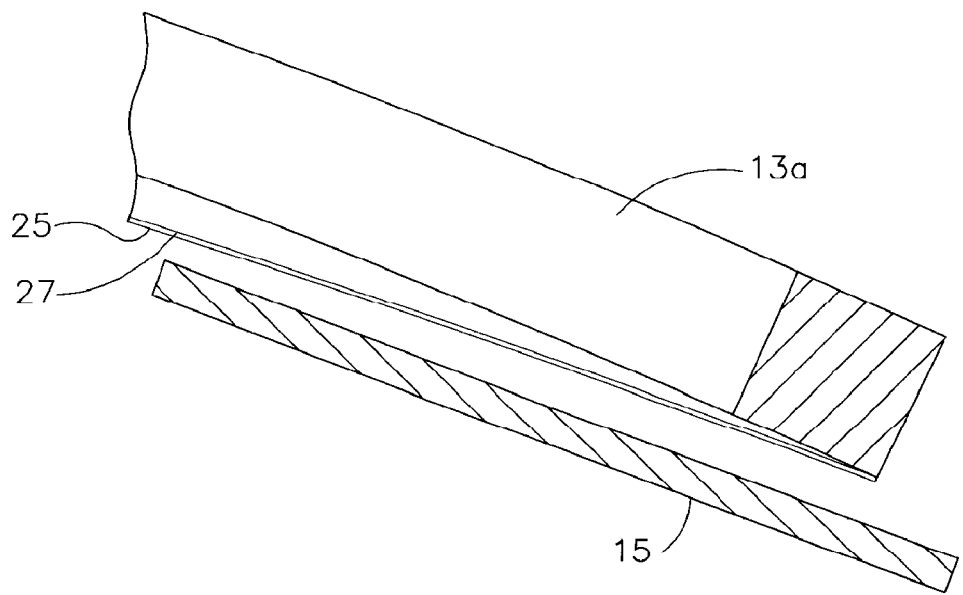
FIG. 8 is an enlarged view of one side of the screen of FIG. 7.

Referring now to the accompanying drawing figures, FIG. 1 shows a perspective view of a projection screen assembly 10 including a projection screen 11 and mounting structure 13 for supporting screen 11. Screen 11 is shown in FIG. 1 as a curved screen in order to best illustrate the inadequacies of existing screen structures, which inadequacies are addressed by the screen structure described herein. Screen 11 is shown detached from the mounting structure 13 in FIG. 1 to best illustrate the typical curved contour of the screen assembly 10. FIG. 2 is a front view of the screen assembly illustrated in FIG. 1. FIG. 3 and FIG. 4 are sectional views of the FIG. 2 structure respectively taken along line 3-3 and line 4-4. As suggested in FIG. 5, movable side masking panels 15 may be disposed on each side of the screen in order to selectively control the aspect ratio of the projection image area on screen 11. Selective positioning of the masking panels is accomplished using motorized control system 16, configured for controllably moving masking panels 15 in front of screen 11 to selectively mask the projection surface of the screen to match the aspect ratio of projected image. FIG. 7 is a view in section of assembly 10a taken along line 7-7 of FIG. 6. As suggested in FIG. 3 and FIG. 7, curved screen structures are defined by generally parallel top and bottom edge elements and generally parallel side elements wherein the intended curvature of the screen has the regular concave shape indicated by the solid concave surface 18 in FIGS. 3 and 18a in FIG. 7. In practice, however, and especially in large screens, the flexible screen material comprising screen 11 (FIG. 3) and screen 11a (FIG. 7) will tend to belly out along the width of the screen from the vertical center thereof toward each side and assume the shape suggested by the screen surface 20 in FIG. 3 or 20a of FIG. 7. Concurrently with the bellying out of screen 11, each side of the screen (see screen 11a of FIG. 7) will likewise belly outwardly as suggested at the detail side of the screen of FIG. 7 and shown in the enlarged view of FIG. 8. With reference now specifically to the detail shown in FIG. 8, the bellying out effect at the sides of the screen 11a as at 25 can potentially result in interference and contact between the screen and masking panel as at 27 of FIG. 8 with the consequence that the screen 11a surface near edges 22 and 23 could be damaged.

Figure 9:
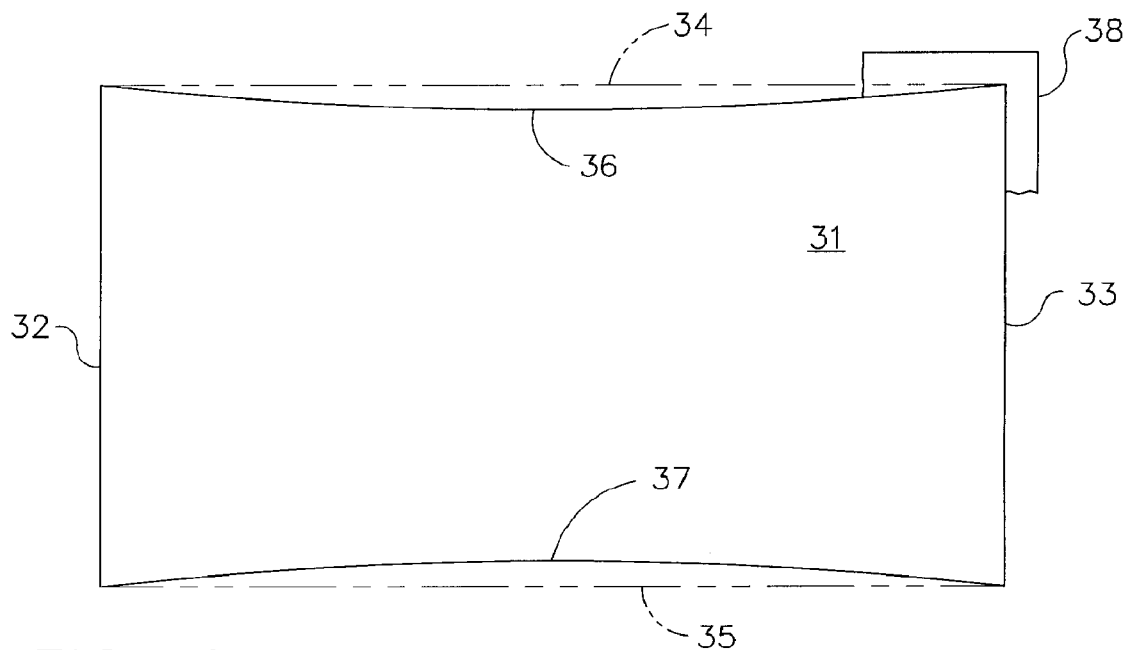
FIG. 9 is a plan view of a section of screen material cut to a shape in accordance with an embodiment of the invention.
Figure 10:
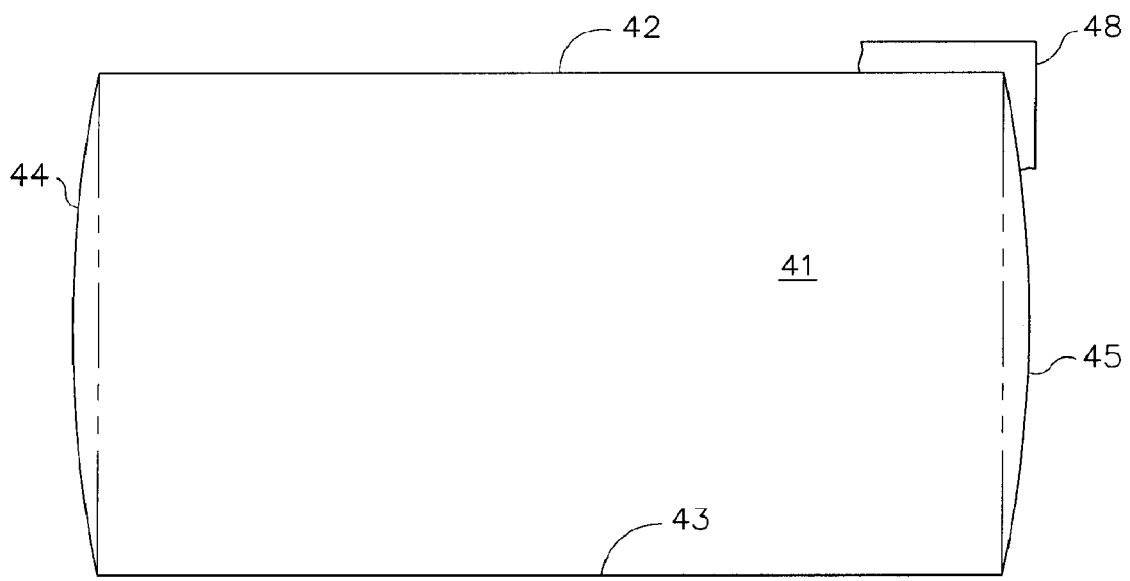
FIG. 10 is a plan view of a section of screen material cut to a shape in accordance with another embodiment of the invention.
Figure 11:
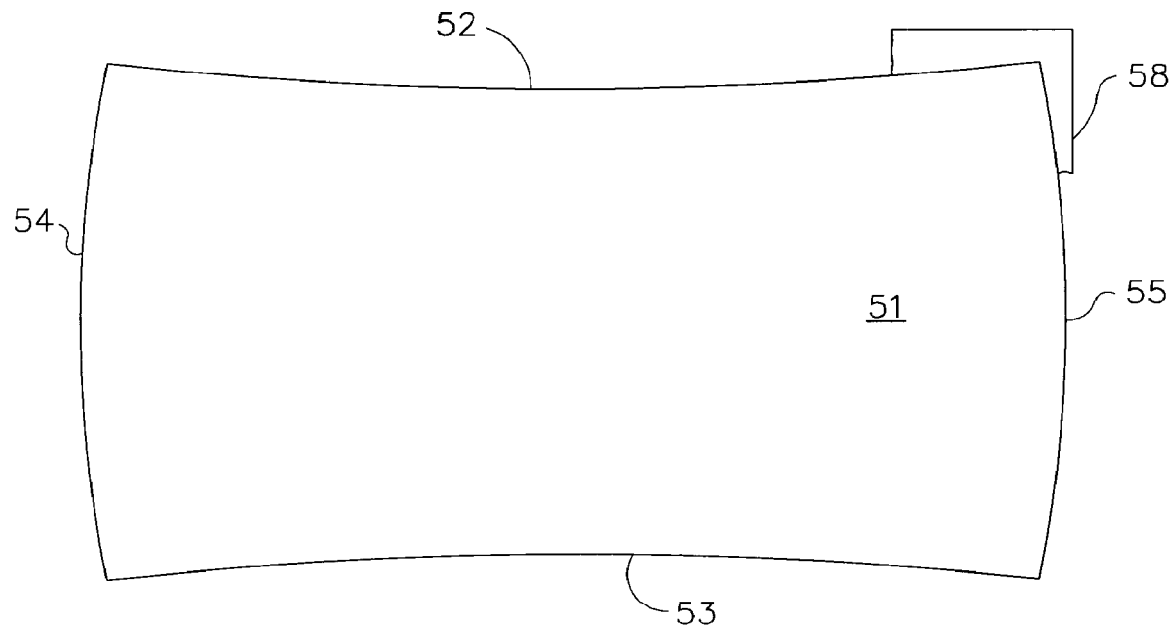
FIG. 11 is a plan view of a section of screen material cut to a shape in accordance with a further embodiment of the invention.

Referring now to FIG. 9, FIG. 10 and FIG. 11 of the drawings, shown therein are plan views of sections of flexible screen material cut to shapes in accordance with embodiments of the present invention. In one embodiment of the invention shown in FIG. 9, a generally rectangularly shaped section of flexible screen material 31 as defined by sides 32 and 33 and top dotted line 34 and bottom dotted line 35 is cut along the top edge to the inwardly curved shape defined by edge 36. In forming the curvature of the cut edge 36 the vertical length (height) of the center of the screen material is smaller than the length (vertical dimension) of sides 32 and 33 by about one inch for each two to ten feet of the length of the sides (i.e., the height of the screen image area in the as-mounted condition for the screen material as discussed below), and typically about one inch for each three to seven feet of image height, and in a specific embodiment, about one inch for each five feet of screen image height. In another embodiment of the invention a similar cut is made at lower edge 35 to define a curvature of curved edge 37 in the ranges just defined for edge 36. In yet another embodiment of the invention, both top edge 34 and bottom edge 35 are cut within the ranges stated to form the shape defined by the solid lines 32, 33, 36 and 37. It is noted that in yet another embodiment of the invention the curved shape of cut edges 36 or 37 may be replaced by straight line cuts (not shown in FIG. 9) defining a shallow V-shaped edge that may approximate the curved edge 36 or 37.

In a further embodiment of the invention as illustrated in FIG. 10, a section of screen material 41 having a top side 42 and bottom side 43 is cut to define a shape having symmetrical outwardly curved sides 44 and 45 and degree of curvature in the ranges described for edges 36 and 37 of FIG. 9. In FIG. 11, a further embodiment of the invention is illustrated that substantially combines the elements of the embodiments shown in FIG. 9 and FIG. 10 wherein a section of screen material 51 is cut to define concave upper edge 52 and concave bottom edge 53, and, additionally, outwardly curved sides 54 and 55.

Figure 12:
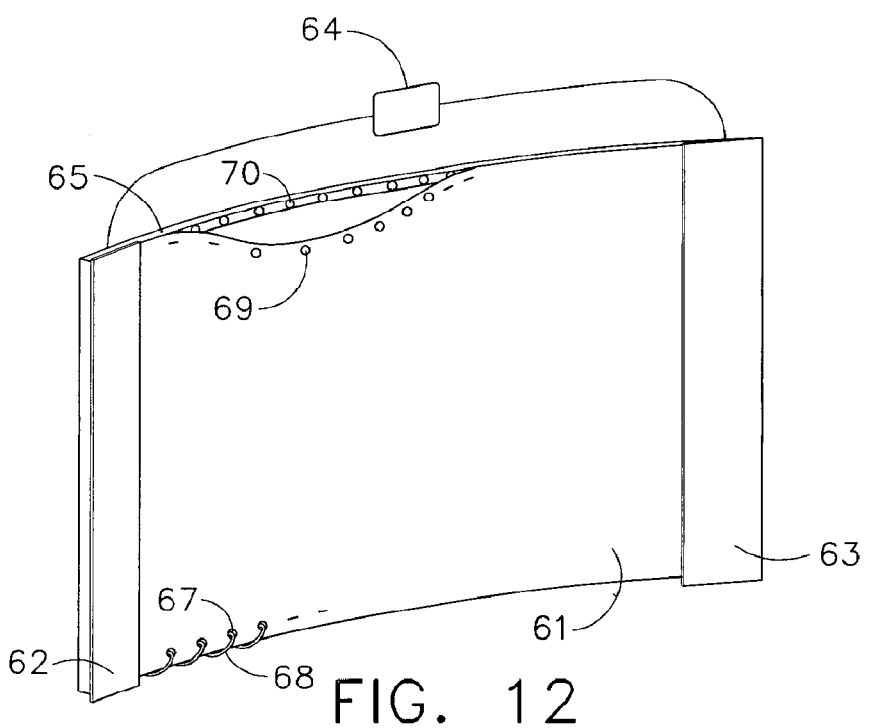
FIG. 12 is a perspective view of a screen according to the invention with movable side masks.

With reference now to FIG. 12, shown therein is a view of an inwardly curved projection screen 60 representative of the invention in the assembled form having screen material 61 mounted to mounting structure 65 for fixed installation in a home cinema theater setting. For fixed screen home cinema theater applications, screen size may typically be of width up to about 12 feet with a fixed height defining a width to height ratio in the range of about 1 to about 3. In order to assemble projection screen 60 using any of the representative embodiments illustrated in the figures, flexible screen material 61 and mounting structure 65 are provided with mounting means by which screen material 61 can be tensioned (stretched) and attached to mounting structure 65, either as a front or rear projection screen. The screen material may be attached to the mounting structure using mounting means that achieve the objective of sufficiently tensioning the flexible screen material to substantially eliminate bulging of the screen surface, the specific mounting means considered limiting of the invention or of the appended claims. It is noted that in accordance with a principal feature of the invention, the screen material is cut to shapes described above and must be tensioned (stretched) to the shape of the mounting structure. The mounting structure typically has substantially parallel curved upper and lower edges and parallel sides, corresponding to the intended curved shape of the finished screen, such as suggested in FIG. 12. Cutting the screen material into a defined shape as described above and mounting the screen material under tension reduces and may substantially eliminate bulging (bellying out) of the screen material in the mounted condition, in the vertical or horizontal planes of the mounted screen. In one embodiment of the invention, the mounting system comprised snaps 69 applied to the screen material around its periphery for attachment to mating snaps 70 attached to the mounting structure 65. Other mounting systems may include tape or vinyl binding, or the screen material can have applied to its periphery grommets or eyelets 67 for attachment of the screen material to mounting structure 65 using peripheral lacing 68. The screen material is then typically tensioned manually and attached to mounting structure 65 as suggested in FIG. 12.

With reference again to FIG. 12, electronically controllable side masking panels 62 and 63 may be included in the structure in order to selectively define a desired image area on the screen surface defined by material 61, for viewing images projected in different aspect ratios. Masking panels 62 and 63 can be selectively movable using electronically controllably (including infrared remote controlled) motorized means suggested schematically as at 64.

The projection screen material may comprise any suitable commercially available flexible screen material known in the applicable art and selected by one skilled in the art in accordance with these teachings, such as polyvinyl chloride (PVC), acrylic, woven cloth or other material, including commercially available screen materials useful in practicing the invention, such as Stewart Filmscreen Corporation FIRE-HAWK, GRAYHAWK, ULTRAMATTE 150, VIDEO-MATTE 200, and STUDIOTEK 130 projection screen fabrics, or their equivalents. The screen material can optionally have a surface treatment thereon in the form of a pearlescent spray treatment or the like for attaining a selected amount of optical gain for the projection surface, or for generally improving the optical gain of the projection surface. Typical white matte finish surfaces exhibit a gain of about 1.0. Gains of about 1.0 to 2.0 are typical for the materials and surface finishes contemplated herein. Such a surface treatment may be particularly desirable for front projection screens made in accordance with these teachings.

In accordance with another aspect of the invention, and with reference again to FIG. 1, an improved projection screen fabrication method may be defined by selecting a screen material, forming the material to the shape as described in relation to FIG. 9, 10 or 11 and mounting the material under tension to an appropriate mounting structure or frame as suggested in FIG. 12, in order to eliminate bulging of the projection surface of the screen.

The present invention therefore provides an improved projection screen for use in displaying imagery from a TV, motion picture projection, video projection, computer generated images display, or the like, wherein the screen material is formed to a configuration as described herein and tensioned in the mounted condition in order to eliminate bellying out of the screen surface. It is understood that modifications to the invention may be made as might occur to one with skill in the field of the invention within the scope of the appended claims. All embodiments contemplated hereunder have therefore not been shown in complete detail. Other embodiments may be developed without departing from the spirit of the invention or from the scope of the appended claims.

What is claimed is:

1. A projection screen structure for home cinema theater applications in displaying an image from a projection source, comprising:
    (a) a sheet of flexible projection screen material for attachment to a generally fixed mounting structure in a mounted condition, said sheet of material having a projection surface for displaying an image projected thereon, said sheet of flexible projection screen material having in an unmounted condition top and bottom edges and first and second side edges, at least one of said top and bottom edges having a curved shape defining a distance at the vertical center of said sheet between said top and bottom edges of said sheet that is smaller than the length of said side edges;
    (b) a generally fixed mounting structure defined by generally parallel inwardly curved top and bottom portions and generally parallel side portions for supporting said sheet of material in said mounted condition as a curved projection screen defining an inwardly curved projection surface up to about 12 feet in width;
    (c) means for tensioning said sheet of material onto said mounting structure whereby outward bulging of said material in the mounted condition on said mounting structure is substantially eliminated; and
    (d) first and second movable masking panels disposed at respective first and second sides of said projection screen.

2. The projection screen structure of claim 1 wherein said tensioning means includes snaps disposed on the periphery of said sheet of material with mating snaps disposed on said mounting structure or grommets disposed on the periphery of said sheet of material with peripheral lacing for attachment of said sheet to said mounting structure.

3. The projection screen structure of claim 1 wherein said material is selected from the group consisting of polyvinyl chloride, woven cloth and acrylic.

4. The projection screen structure of claim 1 further comprising electronically controllable motorized means operatively connected to said movable masking panels for selectively moving said masking panels.

5. The projection screen structure of claim 1 wherein said distance at the vertical center of said sheet is about one inch smaller than the length of said side edges for each two to ten feet of the length of said side edges.

6. The projection screen structure of claim 5 wherein said distance at the vertical center of said sheet is about one inch smaller than the length of said side edges for each five feet of the length of said side edges.

7. A projection screen structure for home cinema theater applications in displaying an image from a projection source, comprising:
   (a) a sheet of flexible projection screen material for attachment to a generally fixed mounting structure in a mounted condition, said sheet of material having a projection surface for displaying an image projected thereon, said sheet of material having in an unmounted condition top and bottom edges and outwardly curved first and second side edges, each of said top and bottom edges having an inwardly curved shape defining a distance at the vertical center of said sheet between said top and bottom edges of said sheet that is smaller than the length of said side edges;
   (b) a generally fixed mounting structure defined by generally parallel inwardly curved top and bottom portions and generally parallel side portions for supporting said sheet of material in said mounted condition as a curved projection screen defining an inwardly curved projection surface up to about 12 feet in width;
   (c) means for tensioning said sheet of material onto said mounting structure whereby outward bulging of said material in the mounted condition on said mounting structure is substantially eliminated; and
   (d) first and second movable masking panels disposed at respective first and second sides of said projection screen.

8. The projection screen structure of claim 7 wherein said tensioning means includes snaps disposed on the periphery of said sheet of material with mating snaps disposed on said mounting structure or grommets disposed on the periphery of said sheet of material with peripheral lacing fbr attachment of said sheet to said mounting structure.

9. The projection screen structure of claim 7 wherein said material is selected from the group consisting of polyvinyl chloride, woven cloth and acrylic.

10. The projection screen structure of claim 7 further comprising electronically controllable motorized means operatively connected to said movable masking panels for selectively moving said masking panels.

11. The projection screen structure of claim 7 wherein said distance at the vertical center of said sheet is about one inch smaller than the length of said side edges for each two to ten feet of the length of said side edges.

12. The projection screen structure of claim 11 wherein said distance at the vertical center of said sheet is about one inch smaller than the length of said side edges for each five feet of the length of said side edges.

13. A method for manufacturing a projection screen structure for home cinema theater applications in displaying an image from a projection source, comprising the steps of:
   (a) providing a sheet of flexible projection screen material having a projection surface for displaying an image projected thereon;
   (b) forming said sheet of material to a configuration having top and bottom edges and first and second side edges, at least one of said top and bottom edges having an inwardly curved shape defining a distance at the vertical center of said sheet between said top and bottom edges of said sheet that is smaller than the length of said side edges;
   (c) providing a generally fixed mounting structure defined by generally parallel inwardly curved top and bottom portions and generally parallel side portions for supporting said sheet of material as a curved projection screen defining an inwardly curved projection surface up to abut 12 feet in width; and
   (d) attaching said sheet of material in a tensioned condition on said mounting structure defining a curved projection surface on said material whereby outward bulging of said material in the tensioned condition on said mounting structure is substantially eliminated.

14. The method of claim 13 wherein the step of attaching said sheet of material includes disposing snaps on the periphery of said sheet of material and mating snaps on said mounting structure or disposing grommets on the periphery of said sheet of material and peripheral lacing attachment to said mounting structure.

15. The method of claim 13 further comprising the step of disposing first and second movable masking panels at respective first and second sides of said projection screen.

16. The method of claim 15 further comprising the step of providing electronically controllable motorized means operatively connected to said movable masking panels for selectively moving said masking panels.

17. The method of claim 13 wherein said material is selected from the group consisting of polyvinyl chloride, woven cloth and acrylic.

18. The method of claim 13 wherein said sheet of material is formed at said at least one of said top and bottom edges to define a distance at the vertical center of said sheet that is about one inch smaller than the length of said side edges for each two to ten feet of the length of said side edges.

19. The method of claim 18 wherein said sheet of material is formed at said at least one of said top and bottom edges to define a distance at the vertical center of said sheet that is about one inch smaller than the length of said side edges for each five feet of the length of said side edges.

* * * * *